(12) United States Patent
Choi et al.

(10) Patent No.: US 9,386,189 B2
(45) Date of Patent: Jul. 5, 2016

(54) DEVICE FOR CONVERTING COLOR GAMUT AND METHOD THEREOF

(71) Applicants: Yong-Seok Choi, Yongin (KR); Byung-Ki Chun, Yongin (KR); Dong-Wook Yang, Yongin (KR)

(72) Inventors: Yong-Seok Choi, Yongin (KR); Byung-Ki Chun, Yongin (KR); Dong-Wook Yang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 86 days.

(21) Appl. No.: 13/960,605

(22) Filed: Aug. 6, 2013

(65) Prior Publication Data

US 2014/0140616 A1 May 22, 2014

(30) Foreign Application Priority Data

Nov. 20, 2012 (KR) .................. 10-2012-0131876

(51) Int. Cl.
*G06K 9/00* (2006.01)
*H04N 1/60* (2006.01)
(52) U.S. Cl.
CPC .................................. *H04N 1/6058* (2013.01)
(58) Field of Classification Search
None
See application file for complete search history.

(56) References Cited

U.S. PATENT DOCUMENTS

| | | | | |
|---|---|---|---|---|
| 7,619,637 B2* | 11/2009 | Higgins | ................... | G09G 5/02 345/589 |
| 7,636,473 B2* | 12/2009 | Imai | ..................... | H04N 1/6077 348/223.1 |
| 8,964,998 B1* | 2/2015 | McClain | .................. | H03G 3/32 381/106 |
| 2004/0113875 A1* | 6/2004 | Miller et al. | .................... | 345/82 |
| 2008/0007806 A1* | 1/2008 | Shirasawa | ..................... | 358/520 |
| 2008/0150958 A1* | 6/2008 | Higgins | ............... | G09G 3/2003 345/591 |
| 2009/0184978 A1* | 7/2009 | Blonde et al. | ................. | 345/647 |
| 2009/0196494 A1* | 8/2009 | Kanai | ...................... | G09G 5/06 382/162 |
| 2011/0268356 A1* | 11/2011 | Tsukada | ....................... | 382/167 |

FOREIGN PATENT DOCUMENTS

| | | |
|---|---|---|
| KR | 10-2004-0055060 | 6/2004 |
| KR | 10-2007-0082727 A | 8/2007 |
| KR | 10-2008-0086677 A | 9/2008 |
| KR | 10-2011-0061947 A | 6/2011 |

* cited by examiner

*Primary Examiner* — Feng Niu
(74) *Attorney, Agent, or Firm* — Lewis Roca Rothgerber Christie LLP (57) ABSTRACT

A color gamut conversion device includes: a target color coordinate converter configured to convert each RGB value of red (R), green (G), blue (B), cyan (C), magenta (M), yellow (Y), and white (W) of a target color coordinate into a tristimulus value XYZ; a reference conversion matrix generator configured to generate a first reference conversion matrix for converting each tristimulus value XYZ into an R'G'B' value according to a color gamut of a reference display; a low power corrected value calculator configured to calculate a low power corrected value for correcting the R'G'B' value; a lookup table (LUT) generator configured to generate an LUT including an R"G"B" value corresponding to each RGB value by using a second reference conversion matrix that the low power corrected value is applied to the first reference conversion matrix; and a color gamut converter configured to convert image data of the RGB values into image data of the R"G"B" values using the LUT.

10 Claims, 6 Drawing Sheets

DEVICE FOR CONVERTING COLOR GAMUT AND METHOD THEREOF

CROSS-REFERENCE TO RELATED APPLICATIONS

This application claims priority to and the benefit of Korean Patent Application No. 10-2012-0131876 filed in the Korean Intellectual Property Office on Nov. 20, 2012, the entire contents of which are incorporated herein by reference.

BACKGROUND (a) Field

The present invention relates to a color gamut conversion device and a method thereof.

(b) Description of the Related Art

In order to most accurately reproduce an image recorded in an optical storing device, such as a digital camera or a camcorder, on a display, the color gamut of the photo storing device and the display should ideally be the same. However, optical storing devices and displays do not have the same color gamut because of differences of the manufacturing process and manufacturing variation.

In order to reduce this problem, an sRGB color gamut that is standardized is used in a D65 (Daylight 6500K) as a color gamut for the storing and the reproducing of the image. This corresponds to a National Television System Committee (NTSC) color gamut of 70%.

However, an organic light emitting display has a wide color gamut (e.g., an NTSC color gamut of 110%) compared with the D65 sRGB color gamut, and a color coordinate of a white color is also different from the D65 sRGB color gamut. Accordingly, the image that is generated with reference to the sRGB color gamut in the D65 is not displayed with the correct color in the organic light emitting display.

The above information disclosed in this Background section is only for enhancement of understanding of the background of the invention and therefore it may contain information that does not form the prior art that is already known in this country to a person of ordinary skill in the art.

SUMMARY

The present invention provides a color gamut conversion device for displaying an image generated in a D65 sRGB standard color gamut with a substantially correct color in an organic light emitting display or a display having a unique color gamut, and a method thereof.

A color gamut conversion device according to an exemplary embodiment of the present invention includes: a target color coordinate converter configured to convert each RGB value of red (R), green (G), blue (B), cyan (C), magenta (M), yellow (Y), and white (W) of a target color coordinate into a tristimulus value XYZ; a reference conversion matrix generator configured to generate a first reference conversion matrix for converting each tristimulus value XYZ into an R'G'B' value according to a color gamut of a reference display; a low power corrected value calculator configured to calculate a low power corrected value for correcting the R'G'B' value; a lookup table (LUT) generator configured to generate an LUT comprising an R"G"B" value corresponding to each RGB value by using a second reference conversion matrix in which the low power corrected value is applied to the first reference conversion matrix; and a color gamut converter configured to convert image data of the RGB values into image data of the R"G"B" values using the LUT.

The target color coordinate may be a color coordinate in a Daylight 6500K D65 sRGB color gamut.

R, G, B, C, M, Y, and W of the target color coordinate may include a maximum chroma in the target color coordinate.

Each RGB value may have a value in a range of 0 to 255 as an RGB format data of a D65 sRGB color gamut.

The low power corrected value may be greater than 0 and less than 1.

The low power corrected value may include a low power ratio value greater than 0 and less than 1.

The color gamut converter may convert the image data of the RGB values into the image data of the R"G"B" values by interpolation using the LUT.

A color gamut conversion method according to another exemplary embodiment of the present invention includes: converting each RGB value of red (R), green (G), blue (B), cyan (C), magenta (M), yellow (Y), and white (W) of a target color coordinate into a tristimulus value XYZ; generating a first reference conversion matrix for converting each tristimulus value XYZ into an R'G'B' value according to a color gamut of a reference display; calculating a low power corrected value for correcting the R'G'B' value; generating a second reference conversion matrix in which the low power corrected value is applied to the first reference conversion matrix; converting each tristimulus value XYZ into an R"G"B" value by using the second reference conversion matrix; generating a lookup table (LUT) comprising an R"G"B" value corresponding to each RGB value; and converting image data of the RGB values into image data of the R"G"B" values using the LUT.

Each RGB value may be in a D65 sRGB color gamut as a standard color gamut for storing and reproducing an image.

Each RGB value may include a maximum chroma in the target color coordinate.

Each RGB value may include a value in a range of 0 to 255 as RGB format data of a D65 sRGB color gamut.

The low power corrected value may be greater than 0 and less than 1.

The low power corrected value may include a low power ratio value greater than 0 and less than 1.

The method may further include converting the image data of the RGB values into the image data of the R"G"B" values by interpolation using the LUT.

A color gamut conversion method according to another exemplary embodiment of the present invention includes: providing image data comprising RGB values of a target color coordinate; and converting the image data comprising RGB values of the target color coordinate into image data comprising R"G"B" values for an organic light emitting display by using a lookup table (LUT), wherein the LUT comprises R"G"B" values corresponding to each RGB value, and each R"G"B" value is generated by using a second reference conversion matrix in which a low power corrected value is applied to a first reference conversion matrix for converting each tristimulus value XYZ into an R'G'B' value according to a color gamut of the organic light emitting display.

The low power corrected value may be greater than 0 and less than 1.

The low power corrected value may include a low power ratio value greater than 0 and less than 1.

In an organic light emitting display or a display having a unique color gamut, an image generated by the D65 sRGB standard color gamut may be displayed with a more accurate color.

Also, when displaying an image generated by the D65 sRGB standard color gamut, the brightness of the organic light emitting display or the display having the unique color gamut may be reduced in the color gamut conversion process, and accordingly power consumption of the display may be reduced.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Furthermore, with exemplary embodiments of the present invention, detailed description is given for the constituent elements in the first exemplary embodiment with reference to the relevant drawings by using the same reference numerals for the same constituent elements, while only different constituent elements from those related to the first exemplary embodiment are described in other exemplary embodiments.

Some of the parts that might not be necessary for a complete understanding of the described embodiments may have been omitted in order to clearly describe the embodiments of the present invention, and like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
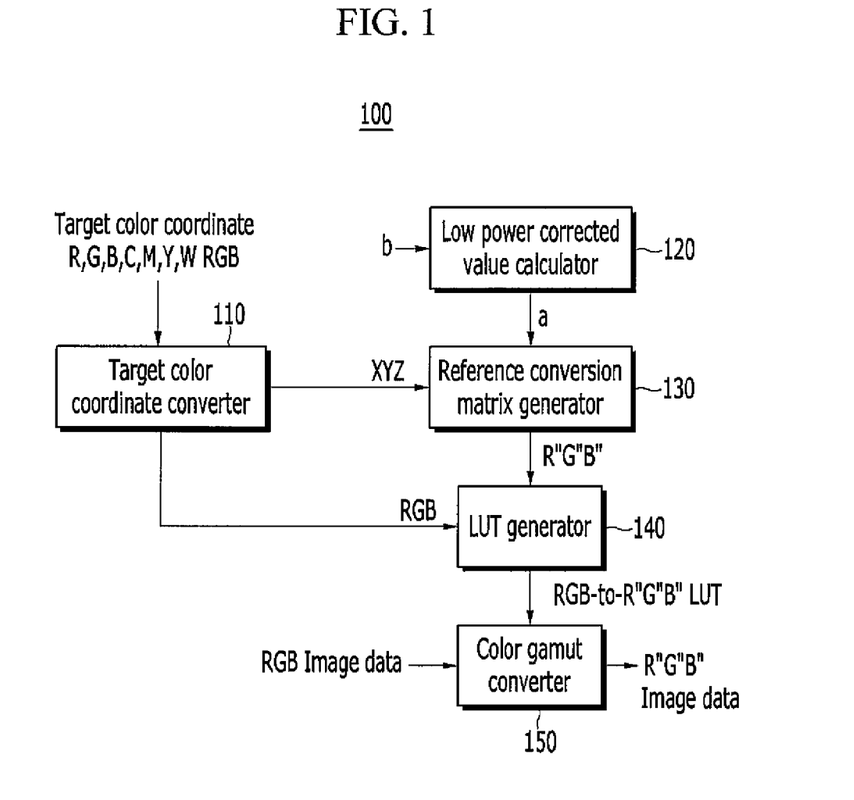
FIG. 1 is a block diagram of a color gamut conversion device according to an exemplary embodiment of the present invention.

FIG. 1 is a block diagram of a color gamut conversion device according to an exemplary embodiment of the present invention.

Referring to FIG. 1, a color gamut conversion device 100 includes a target color coordinate converter 110, a low power corrected value calculator 120, a reference conversion matrix generator 130, a LUT (lookup table) generator 140, and a color gamut converter 150.

Hereafter, a target color coordinate refers to a color coordinate in a color gamut used in an optical storing device that records an image, such as a digital camera or a camcorder. The target color coordinate may be a color coordinate in a D65 (Daylight 6500K) sRGB color gamut of a standard color gamut for storing and reproducing the image. The reference display refers to a display displaying the image according to the image data. The reference display may be an organic light emitting display or a display having a unique color gamut.

The target color coordinate converter 110 is configured to convert each RGB value of R, G, B, C, M, Y, and W of the target color coordinate into a tristimulus value XYZ. Here, R refers to red, G refers to green, B refers to blue, C refers to cyan, M refers to magenta, Y refers to yellow, and W refers to white. R, G, B, C, M, Y, and W of the target color coordinate refers to R, G, B, C, M, Y, and W having a maximum chroma in the target color coordinate. The RGB value includes a red value, a green value, and a blue value. Each RGB value of R, G, B, C, M, Y, and W has a value in a range of 0 to 255 as an RGB format data of the D65 sRGB color gamut.

Table 1 represents each RGB value of R, G, B, C, M, Y, and W having the maximum chroma in the target color coordinate.

TABLE 1

| Color | R value | G value | B value |
| --- | --- | --- | --- |
| Red | 255 | 0 | 0 |
| Green | 0 | 255 | 0 |
| Blue | 0 | 0 | 255 |
| Cyan | 0 | 255 | 255 |
| Magenta | 255 | 0 | 255 |
| Yellow | 255 | 255 | 0 |
| White | 255 | 255 | 255 |

Equation 1 is a matrix in which the RGB value of the color coordinate is converted into a tristimulus value XYZ in the D65 sRGB color gamut.

$$\begin{bmatrix} X \\ Y \\ Z \end{bmatrix} = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix} \begin{bmatrix} R \\ G \\ B \end{bmatrix} \quad \text{(Equation 1)}$$

The target color coordinate converter 110 substitutes each RGB value of R, G, B, C, M, Y, and W in the target color coordinate to Equation 1 to convert each RGB value of R, G, B, C, M, Y, and W into the tristimulus value XYZ. The target color coordinate converter 110 transmits each tristimulus value XYZ of R, G, B, C, M, Y, and W of the target color coordinate to the reference conversion matrix generator 130. At this time, the target color coordinate converter 110 transmits each RGB value of R, G, B, C, M, Y, and W of the target color coordinate to the LUT generator 140.

The reference conversion matrix generator 130 generates the first reference conversion matrix reflecting the color gamut characteristic of the reference display. The first reference conversion matrix is the matrix converting the tristimulus value XYZ into an R'G'B' value. A color gamut characteristic of the reference display may be measured through a measuring device such as an optical measurer.

Equation 2 represents the first reference conversion matrix reflecting the color gamut characteristic of the reference display.

$$\begin{bmatrix} R' \\ G' \\ B' \end{bmatrix} = \begin{bmatrix} xr & xg & xb \\ yr & yg & yb \\ zr & zg & zb \end{bmatrix}^{-1} \begin{bmatrix} Kr & 0 & 0 \\ 0 & Kg & 0 \\ 0 & 0 & Kb \end{bmatrix}^{-1} \begin{bmatrix} X \\ Y \\ Z \end{bmatrix} \quad \text{(Equation 2)}$$

Here, xr, xg, xb, yr, yg, yb, zr, zg, and zb are values that are determined by measuring the color gamut characteristic of the reference display. Kr, Kg, and Kb are obtained according to the characteristics of the reference display as a gain of the R'G'B' value.

Equation 3 represents one example of Kr, Kg, and Kb that are obtained according to the characteristics of the reference display.

$$\begin{bmatrix} Kr \\ Kg \\ Kb \end{bmatrix} = \begin{bmatrix} xr & xg & xb \\ yr & yg & yb \\ zr & zg & zb \end{bmatrix}^{-1} \begin{bmatrix} xw/yw \\ 1 \\ zw/yw \end{bmatrix} = \frac{1}{yw} \begin{bmatrix} xr & xg & xb \\ yr & yg & yb \\ zr & zg & zb \end{bmatrix}^{-1} \begin{bmatrix} xw \\ yw \\ zw \end{bmatrix} \quad \text{(Equation 3)}$$

Here, xr, xg, xb, yr, yg, yb, zr, zg, zb, xw, yw, and zw are values that are determined by measuring the color gamut characteristics of the reference display.

The low power corrected value calculator 120 is configured to calculate a low power corrected value "a," for correcting or reducing an R'G'B' value. The low power corrected value "a" is calculated by using the first reference conversion matrix. If each tristimulus value XYZ of R, G, B, C, M, Y, and W of the target color coordinate is substituted to Equation 2, the R'G'B' value that is determined as the value in a range of 0 to 255 cannot exceed 255. When the reference display is a display processing the image data of 8 bits, the R'G'B' value exceeding 255 may not be processed. Accordingly, the low power corrected value calculator 120 calculates the low power corrected value "a" for correcting or reducing the R'G'B' value.

Equation 4 represents an equation for calculating the low power corrected value "a".

$$a = [1/(exc/255)^{2.2}] \times b \quad \text{(Equation 4)}$$

Here, "exc" is an R'G'B' value exceeding 255 and may be selected as a largest value among R'G'B' values exceeding 255. "b" is a low power ratio value that is transmitted and determined outside. The low power ratio value "b" may be determined according to a degree that is required by a user. The low power corrected value "a" is greater than zero and less than or equal to 1 (e.g., 0<a≤1), and the low power ratio value "b" is greater than zero and less than or equal to 1 (e.g., 0<b≤1).

The low power corrected value calculator 120 is configured to transmit the calculated low power corrected value "a" to the reference conversion matrix generator 130.

The reference conversion matrix generator 130 is configured to multiply the low power corrected value "a" by Kr, Kg, and Kb to generate Kr', Kg', and Kb', and applies Kr', Kg', and Kb' to the first reference conversion matrix to generate the second reference conversion matrix. That is, the second reference conversion matrix is one in which the low power corrected value "a" is applied to the first reference conversion matrix.

Equation 5 represents the second reference conversion matrix reflecting the low power corrected value.

$$\begin{bmatrix} R'' \\ G'' \\ B'' \end{bmatrix} = \begin{bmatrix} xr & xg & xb \\ yr & yg & yb \\ zr & zg & zb \end{bmatrix}^{-1} \begin{bmatrix} Kr' & 0 & 0 \\ 0 & Kg' & 0 \\ 0 & 0 & Kb' \end{bmatrix}^{-1} \begin{bmatrix} X \\ Y \\ Z \end{bmatrix} \quad \text{(Equation 5)}$$

Here, Kr' is a×Kr, Kg' is a×Kg, and Kb' is a×Kb.

The reference conversion matrix generator 130 is configured to convert each tristimulus value XYZ of R, G, B, C, M, Y, and W of the target color coordinate into the R"G"B" value by using the second reference conversion matrix. That is, the reference conversion matrix generator 130 is configured to substitute each tristimulus value XYZ of R, G, B, C, M, Y, and W of the target color coordinate into Equation 5, thereby calculating the R"G"B" value respectively corresponding to R, G, B, C, M, Y, and W of the target color coordinate.

The reference conversion matrix generator 130 is configured to transmit the R"G"B" value respectively corresponding to R, G, B, C, M, Y, and W of the target color coordinate to the LUT generator 140.

The LUT generator 140 is configured to generate an RGB-to-R"G"B" lookup table (LUT) by using each RGB value of R, G, B, C, M, Y, and W of the target color coordinate and the R"G"B" value corresponding thereto. The RGB-to-R"G"B" LUT is a LUT mapping the RGB value in the target color coordinate into the R"G"B" value in the color coordinate of the reference display. The RGB-to-R"G"B" LUT may include each RGB value of R, G, B, C, M, Y, and W having the maximum chroma in the target color coordinate and the R"G"B" value corresponding thereto.

If all RGB values are input in the target color coordinate, the R"G"B" value corresponding to all RGB values may be calculated by using Equation 1 converting the RGB value of the color coordinate in the D65 sRGB color gamut into the tristimulus value XYZ and Equation 5 of the second reference conversion matrix. Accordingly, the RGB-to-R"G"B" LUT may include the R"G"B" value corresponding to all RGB values of the target color coordinate.

The LUT generator 140 is configured to transmit the generated RGB-to-R"G"B" LUT to the color gamut converter 150.

The color gamut converter 150 is configured to receive the image data of the RGB value of the target color coordinate. The color gamut converter 150 is further configured to convert the image data of the RGB value of the target color coordinate into the image data of the R"G"B" value of the reference display by using the RGB-to-R"G"B" LUT. When the RGB-to-R"G"B" LUT includes all RGB values of the target color coordinate and the R"G"B" value corresponding thereto, the color gamut converter 150 may find and output the R"G"B" value corresponding to the RGB value of the image data in the RGB-to-R"G"B" LUT. When the RGB-to-R"G"B" LUT includes each RGB value of R, G, B, C, M, Y, and W having the maximum chroma in the target color coordinate and the R"G"B" value corresponding thereto, the color gamut converter 150 may calculate the R"G"B" value by interpolation using the RGB-to-R"G"B" LUT for the RGB value except for the maximum chroma.

The image data of the R"G"B" value calculated in the color gamut converter 150 may consist of 8 bits, and the reference display processes the image data of 8 bits thereby displaying the image.

Figure 2:
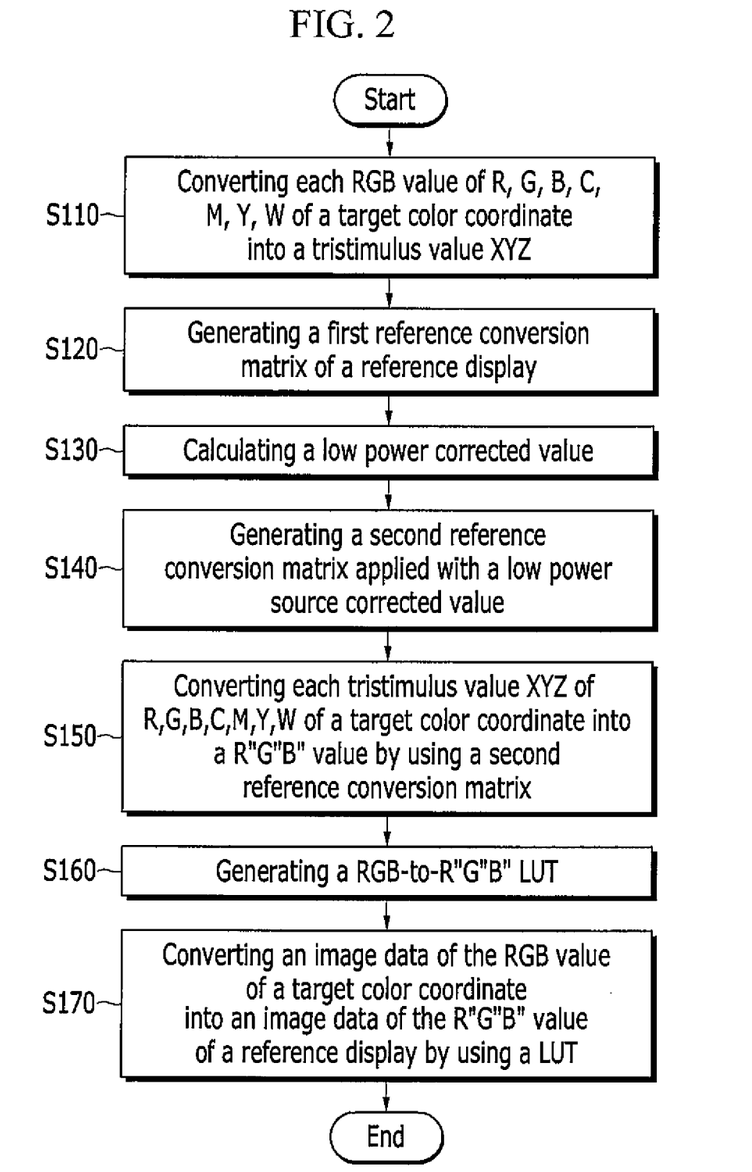
FIG. 2 is a flowchart of a color gamut conversion method according to an exemplary embodiment of the present invention.

FIG. 2 is a flowchart of a color gamut conversion method according to an exemplary embodiment of the present invention.

Referring to FIG. 2, each RGB value of R, G, B, C, M, Y, and W of the target color coordinate is converted into the tristimulus value XYZ (S110). R, G, B, C, M, Y, and W of the target color coordinate mean red R, green G, blue B, cyan C, magenta M, yellow Y, and white W having the maximum chroma in the target color coordinate. The target color coordinate may be a color coordinate in a Daylight 6500K (D65) sRGB color gamut as a standard color gamut for the storing and the reproducing of the image. At this time, by using Equation 1 of FIG. 1, each RGB value of R, G, B, C, M, Y, and W of the target color coordinate may be converted into the tristimulus value XYZ.

The first reference conversion matrix reflecting the color gamut characteristic of the reference display is generated (S120). The color gamut characteristic of the reference display may be measured through a measuring device such as an optical measurer, and the first reference conversion matrix for converting the tristimulus value XYZ into the R'G'B' value may be generated according to the color gamut characteristic of the reference display. The first reference conversion matrix may be generated according to Equation 2.

The low power corrected value for correcting or reducing the R'G'B' value calculated by using the first reference conversion matrix is calculated (S130). The low power corrected value is a value for correcting the R'G'B' value that is calculated by using the first reference conversion matrix not exceeding 8 bits. The low power corrected value includes the low power ratio value that may be determined according to the degree required for the user. As the user decreases the low power ratio value, the R"G"B" value of the image data input to the reference display is decreased, and the reference display displays the image with relatively low power. The low power corrected value may be calculated by Equation 4.

The low power corrected value is applied to the first reference conversion matrix to generate the second reference conversion matrix (S140). The low power corrected value "a" has the value greater than zero and less than or equal to 1 (e.g., 0<a≤1) such that the R"G"B" value calculated by using the second reference conversion matrix is smaller than the R'G'B' value calculated by using the first reference conversion matrix. The second reference conversion matrix may be generated according to Equation 5.

Each tristimulus value XYZ of R, G, B, C, M, Y, and W of the target color coordinate is converted into the R"G"B" value corresponding to R, G, B, C, M, Y, and W of the target color coordinate by using the second reference conversion matrix (S150).

An RGB-to-R"G"B" lookup table (LUT) is generated by using each RGB value of R, G, B, C, M, Y, and W of the target color coordinate and the R"G"B" value corresponding thereto (S160). The RGB-to-R"G"B" LUT maps the RGB value in the target color coordinate into the corresponding R"G"B" value in the color coordinate of the reference display. The RGB-to-R"G"B" LUT may include each RGB value of R, G, B, C, M, Y, and W having the maximum chroma in the target color coordinate and the R"G"B" value corresponding thereto. Also, the RGB-to-R"G"B" LUT may include each RGB value of the target color coordinate and the R"G"B" value corresponding thereto.

The image data of the RGB value of the target color coordinate is converted into the image data of the R"G"B" value of the reference display by using the RGB-to-R"G"B" LUT (S170). When the RGB-to-R"G"B" LUT includes each RGB value of R, G, B, C, M, Y, and W having the maximum chroma in the target color coordinate and the R"G"B" value corresponding thereto, the image data of the RGB value except for the maximum chroma may be converted into the image data of the R"G"B" value by interpolation using the RGB-to-R"G"B" LUT.

In the above, the method of generating the RGB-to-R"G"B" LUT applied with the low power corrected value from each RGB value of R, G, B, C, M, Y, and W of the target color coordinate in the D65 (Daylight 6500K) sRGB color gamut as the standard color gamut was described. The suggested method may also be applied to a case of differently expressing R, G, B, C, M, Y, and W of the target color coordinate.

For example, the RGB-to-R"G"B" LUT applied with the low power corrected value may be generated from each xyY value of R, G, B, C, M, Y, and W of the target color coordinate in an xyY colorimetric system. In the xyY value, the x,y value represents an RGB mixture ratio, and Y represents a luminance. Also, in the xyY colorimetric system, a YCbCr-to-R"G"B" LUT applied with the low power corrected value may be generated from each xyY value of R, G, B, C, M, Y, and W of the target color coordinate. The YCbCr is a color gamut used in the image system, Y represents a luminance component, and Cb and Cr are chrominance components. The image data having a YCbCr value may be converted into the image data having the R"G"B" value by using the YCbCr-to-R"G"B" LUT. A conversion relation between the xyY value and the RGB value and a conversion relation between the YCbCr value and the RGB value may use a method that is generally defined.

Next, experimental results of a color error and a brightness error of a case of performing a color gamut conversion according the suggest method and a case in which a color gamut conversion is not performed for the image data generated by the D65 sRGB standard color gamut will be described with reference to FIGS. 3 to 6.

Figure 3:
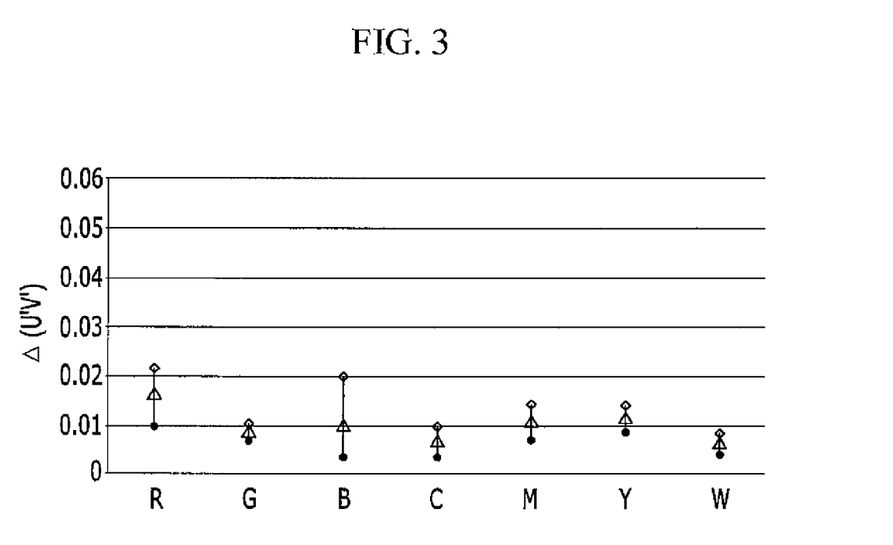
FIG. 3 is an experiment graph of a color error of an image displayed in an organic light emitting display when converting image data of a D65 sRGB standard color gamut as a color gamut conversion method according to an exemplary embodiment of the present invention.
Figure 4:
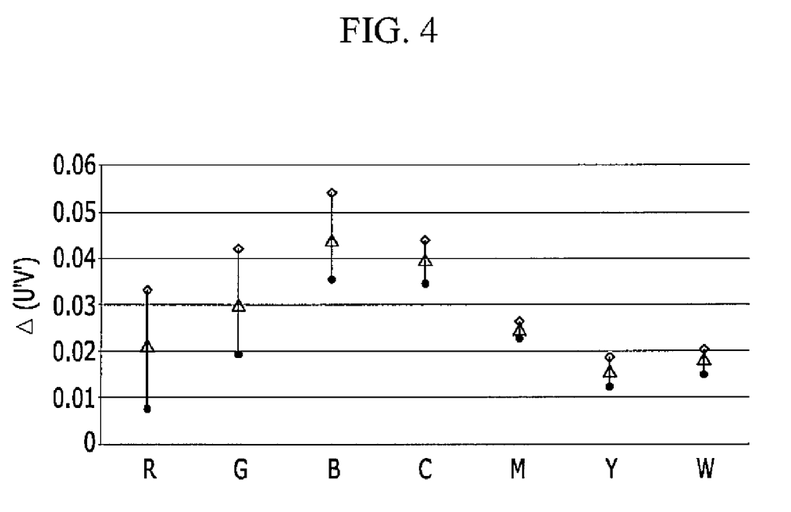
FIG. 4 is an experiment graph of a color error of an image when displaying image data of a D65 sRGB standard color gamut in an organic light emitting display without a color gamut conversion.
Figure 5:
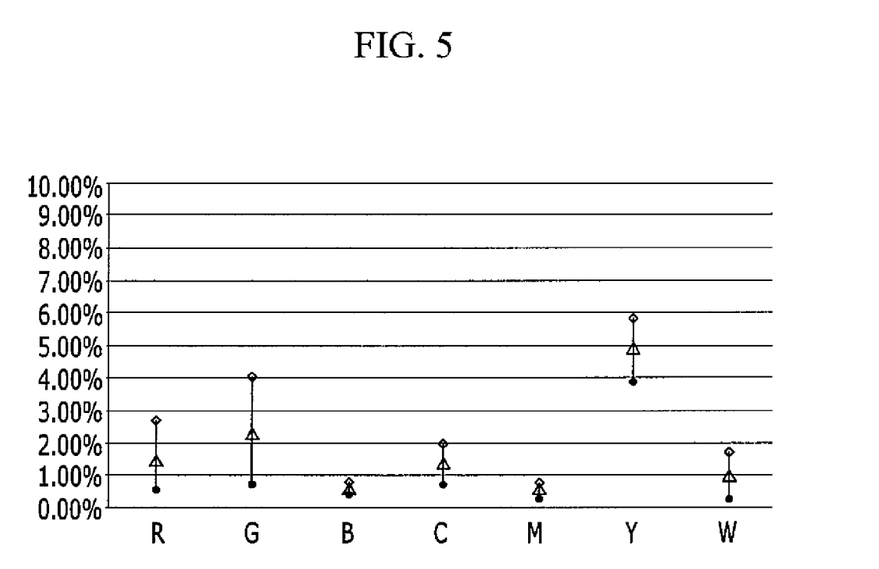
FIG. 5 is an experiment graph of a color error of an image displayed in an organic light emitting display when converting image data of a D65 sRGB standard color gamut as a color gamut conversion method according to an exemplary embodiment of the present invention.
Figure 6:
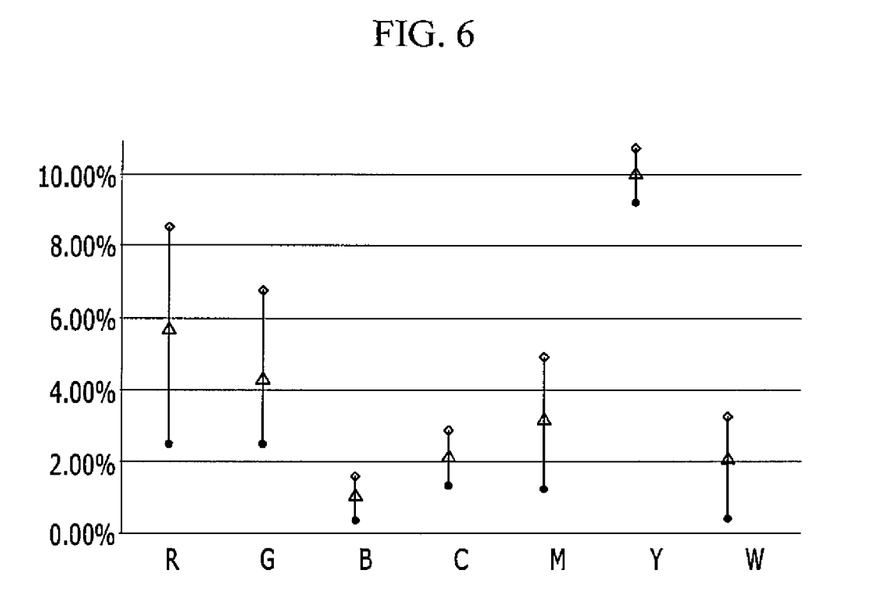
FIG. 6 is an experiment graph of a color error of an image when displaying image data of a D65 sRGB standard color gamut in an organic light emitting display without a color gamut conversion.

FIG. 3 is an experiment graph of a color error of an image displayed in an organic light emitting display when converting image data of a D65 sRGB standard color gamut as a color gamut conversion method according to an exemplary embodiment of the present invention. FIG. 4 is an experiment graph of a color error of an image when displaying image data of a D65 sRGB standard color gamut in an organic light emitting display without a color gamut conversion. FIG. 5 is an experiment graph of a color error of an image displayed in an organic light emitting display when converting image data of a D65 sRGB standard color gamut as a color gamut conversion method according to an exemplary embodiment of the present invention. FIG. 6 is an experiment graph of a color error of an image when displaying image data of a D65 sRGB standard color gamut in an organic light emitting display without a color gamut conversion.

Referring to FIGS. 3 to 6, for an image displayed by inputting each image data of R, G, B, C, M, Y, and W of the D65 sRGB standard color gamut to five general organic light emitting diode (OLED) displays, a maximum value (◇), a minimum value (●), and an average value (Δ) of the color error Δ(u'v') and the brightness error (%) for the D65 sRGB standard are measured. The brightness error is measured as a relative ratio with reference to a brightness of a full white as 100%.

In FIG. 3, the color error of the image displayed by inputting the image data of the R"G"B" value to the OLED display after performing the color gamut conversion according to the suggested method for each image data of R, G, B, C, M, Y, and W of the D65 sRGB standard color gamut is measured. At this time, the low power corrected value "a" is applied as a value in a range of 0.8 to 0.95.

In FIG. 4, the color error of the image displayed by inputting the image data of each RGB value of R, G, B, C, M, Y, and W of the D65 sRGB standard color gamut to the OLED display is measured.

Compared with the graph of FIG. 3 and the graph of FIG. 4, for the case of inputting the image data of each RGB value of R, G, B, C, M, Y, and W of the D65 sRGB standard color gamut to the OLED display as it is, it may be confirmed that the color error of the image displayed when inputting the image data of the R"G"B" value to the OLED display after performing the color gamut conversion according to the suggested method is reduced.

In FIG. 5, the brightness error of the image displayed by inputting the image data of the R"G"B" value to the OLED display after performing the color gamut conversion according to the suggested method for each image data of R, G, B, C, M, Y, and W of the D65 sRGB standard color gamut is measured. At this time, the low power corrected value "a" is applied as a value in a range of 0.8 to 0.95.

In FIG. 6, the brightness error of the image displayed by inputting the image data of each RGB value of R, G, B, C, M, Y, and W of the D65 sRGB standard color gamut to the OLED display is measured.

Compared with the graph of FIG. 5 and the graph of FIG. 6, for the case of inputting the image data of each RGB value of R, G, B, C, M, Y, and W of the D65 sRGB standard color gamut to the OLED display as it is, it may be confirmed that the brightness error of the image displayed when inputting the image data of the R"G"B" value to the OLED display after performing the color gamut conversion according to the suggested method is reduced.

That is, it may be confirmed that the image generated by the D65 sRGB standard color gamut according to the suggested color gamut conversion method may be more accurately displayed in the organic light emitting display. Also, although the brightness of the image displayed by the low power corrected value "a" or the low power ratio value "b" in the suggest color gamut conversion method may be decreased, the color coordinate is maintained.

The drawings referred to hereinabove and the detailed description of the disclosed invention are presented for illustrative purposes only, and are not intended to define meanings or limit the scope of the present invention as set forth in the following claims. Those skilled in the art will understand that various modifications and equivalent embodiments of the present invention are possible. Consequently, the true technical protective scope of the present invention must be determined based on the technical spirit of the appended claims, or their equivalents.

DESCRIPTION OF SOME OF THE REFERENCE SYMBOLS

100: color gamut conversion device
110: target color coordinate converter
120: low power corrected value calculator
130: reference conversion matrix generator
140: LUT generator
150: color gamut converter

What is claimed is:

1. A method of converting a color gamut, comprising:
   converting each RGB value of red (R), green (G), blue (B), cyan (C), magenta (M), yellow (Y), and white (W) of a target color coordinate into a tristimulus value XYZ;
   generating a first reference conversion matrix for converting each tristimulus value XYZ into an R'G'B' value according to a color gamut of a reference display;
   calculating a low power corrected value for correcting the R'G'B' value based on a user-supplied low power ratio value;
   generating a second reference conversion matrix in which the low power corrected value is applied to the first reference conversion matrix;
   converting each tristimulus value XYZ into an R"G"B" value by using the second reference conversion matrix;
   generating a lookup table (LUT) comprising an R"G"B" value corresponding to each RGB value;
   converting image data of the RGB values into image data of the R"G"B" values using the LUT; and
   displaying an image on a display device based on the image data of the R"G"B" values,
   wherein the low power corrected value is calculated according to the following equation:

$a = [1/(exc/255)^{2.2}] \times b$ wherein "a" is the low power corrected value, "exc" is an R'G'B' value exceeding 255, and "b" is the user supplied low power ratio value.

2. The method of claim 1, wherein
   each RGB value is in a D65 sRGB color gamut as a standard color gamut for storing and reproducing an image.

3. The method of claim 1, wherein
   each RGB value comprises a maximum chroma in the target color coordinate.

4. The method of claim 1, wherein
   each RGB value comprises a value in a range of 0 to 255 as RGB format data of a D65 sRGB color gamut.

5. The method of claim 1, wherein the low power corrected value is greater than 0 and less than 1.

6. The method of claim 1, wherein
   the low power corrected value comprises a low power ratio value greater than 0 and less than 1.

7. The method of claim 1, further comprising converting the image data of the RGB values into the image data of the R"G"B" values by interpolation using the LUT.

8. A method of converting a color gamut comprising:
   providing image data comprising RGB values of a target color coordinate; converting the image data comprising RGB values of the target color coordinate into image data comprising R"G"B" values for an organic light emitting display by using a lookup table (LUT),
   wherein the LUT comprises R"G"B" values corresponding to each RGB value, and
   each R"G"B" value is generated by using a second reference conversion matrix in which a low power corrected value is calculated based on a user-supplied low power ratio value and is applied to a first reference conversion matrix for converting each tristimulus value XYZ into an R'G'B' value according to a color gamut of the organic light emitting display; and
   displaying an image on the organic light emitting display based on the image data comprising the R"G"B" values, wherein the low power corrected value is calculated according to the following equation:

$a = [1/(exc/255)^{2.2}] \times b$ wherein "a" is the low power corrected value, "exc" is an R'G'B' value exceeding 255, and "b" is the user supplied low power ratio value.

9. The method of claim 8, wherein
   the low power corrected value is greater than 0 and less than 1.

10. The method of claim 9, wherein
    the low power corrected value comprises a low power ratio value greater than 0 and less than 1.

* * * * *